(12) United States Patent
Monteith

(10) Patent No.: US 6,371,690 B1
(45) Date of Patent: Apr. 16, 2002

(54) METHOD AND APPARATUS FOR HANDLING WATER AT LOW AND HIGH FEED RATES

(76) Inventor: Joseph Gordon Monteith, 12 Madison Ave., Toronto (CA)

( * ) Notice: Subject to any disclaimer, the term of this patent is extended or adjusted under 35 U.S.C. 154(b) by 0 days.

(21) Appl. No.: 09/731,045

(22) Filed: Dec. 7, 2000

(51) Int. Cl.$^7$ .............................. B01D 21/00; E01F 5/00
(52) U.S. Cl. .............................. 405/39; 405/36; 404/2; 404/4; 210/170; 210/532.2; 210/790
(58) Field of Search .............................. 405/36, 39, 40, 405/41, 51, 80, 87, 92, 124–126; 404/2, 3, 4; 210/170, 519, 521, 532.1, 532.2, 538, 540, 790, 801

(56) References Cited

U.S. PATENT DOCUMENTS

| | | | | |
|---|---|---|---|---|
| 1,616,394 A | * | 2/1927 | Schiding | 210/532.2 X |
| 1,649,028 A | * | 11/1927 | Gutman | 210/532.2 |
| 5,609,754 A | * | 3/1997 | Stuth | 210/532.2 X |
| 5,645,732 A | * | 7/1997 | Daniels | 210/532.2 X |
| 5,725,760 A | * | 3/1998 | Monteith | 210/170 |
| 5,746,912 A | * | 5/1998 | Monteith | 210/170 |
| 5,849,181 A | * | 12/1998 | Monteith | 210/532.1 X |
| 6,062,767 A | * | 5/2000 | Kizhnerman et al. | 405/39 |
| 6,068,765 A | * | 5/2000 | Monteith | 210/170 |
| 6,077,448 A | * | 6/2000 | Tran-Quoc-Nam et al. | 210/790 |
| 6,315,899 B1 | * | 11/2001 | Hernandez | 210/540 X |
| 6,328,890 B1 | * | 12/2001 | Thibault | 210/532.2 |

FOREIGN PATENT DOCUMENTS

| | | | | |
|---|---|---|---|---|
| DE | 3737031 | * | 3/1989 | 210/519 |
| GB | 2126264 | * | 3/1984 | 405/40 |

* cited by examiner

Primary Examiner—Thomas B. Will
Assistant Examiner—Jong-Suk Lee
(74) Attorney, Agent, or Firm—Shoemaker and Mattare

(57) ABSTRACT

A liquid-handling installation utilizes an upstream and a downstream separator unit, each unit having a horizontal partition defining a treatment compartment below the partition and an overflow compartment above the partition. Each unit has an inlet opening and an outlet opening. Two conduits communicate the outlet opening of the upstream unit with the inlet opening of the downstream unit. The operating process includes: a) dividing first and second substantially equal streams any liquid arriving ay the inlet opening of the upstream unit; passing the first stream through the upstream unit treatment compartment, thence along the first conduit, thence over the downstream unit partition to the outlet opening of the downstream unit, and simultaneously passing the second stream over the upstream unit partition, thence along the second conduit, thence through the downstream unit treatment compartment, and finally to the outlet opening of the downstream unit; and b) when the total arriving liquid is greater than can be accommodated by the two treatment compartments, allowing the liquid to overflow all weirs and partitions and pass directly from the upstream inlet opening to the downstream outlet opening

5 Claims, 2 Drawing Sheets

US 6,371,690 B1

METHOD AND APPARATUS FOR HANDLING WATER AT LOW AND HIGH FEED RATES

Figure 1:
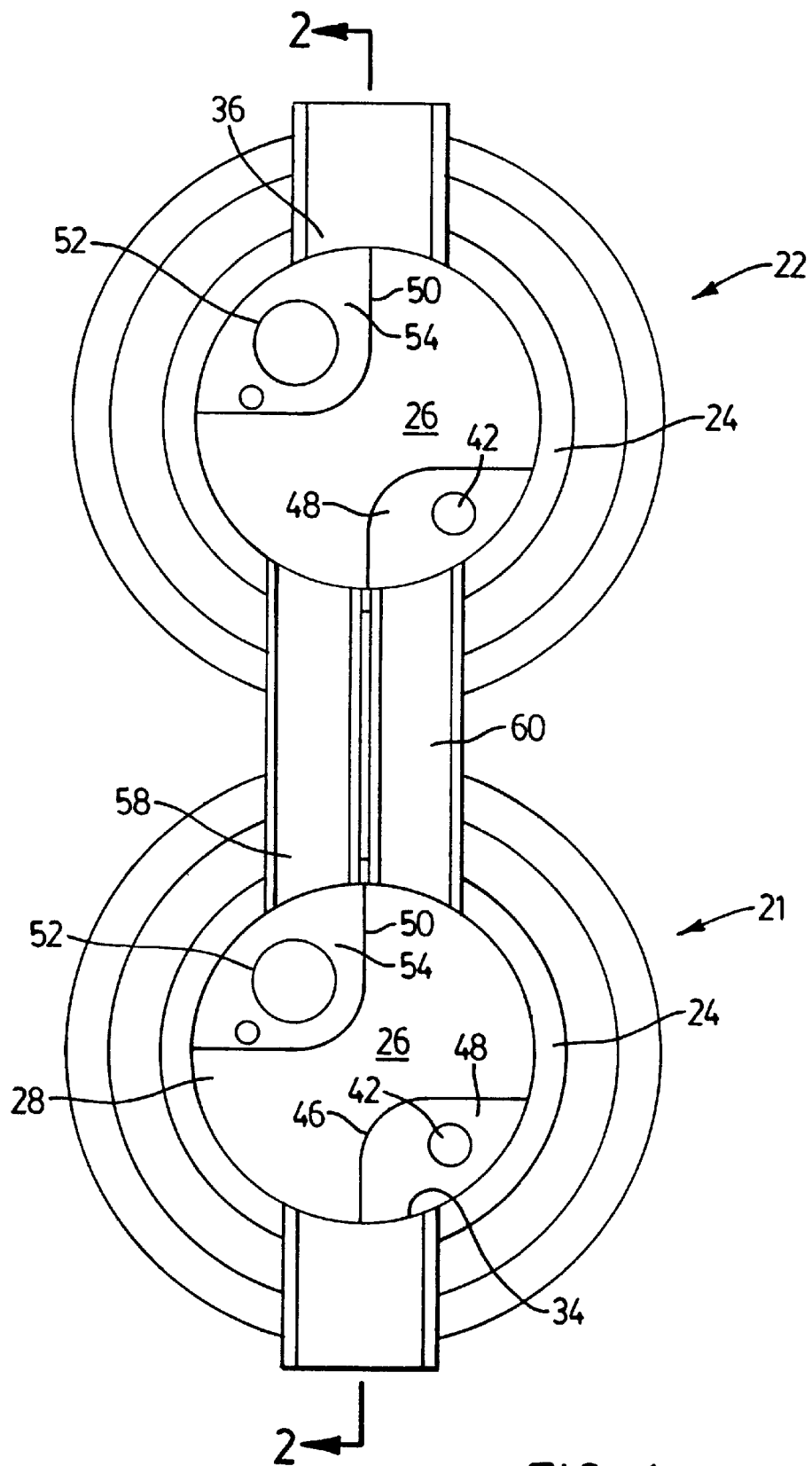

This invention relates generally to an installation adapted to handle both low-flow and high-flow conditions. Low-flow conditions would include the escape of various liquids from automotive service stations or mild precipitation, while high-flow conditions would include storm surges in which he flow rate can DC several orders of magnitude greater.

BACKGROUND OF THIS INVENTION

This invention is based upon the configuration of a particular water-handling device that has been available on the market for several years. The name of the unit is "Stormceptor"™. The Stormceptor unit has an outer wall enclosing an internal volume, and each unit has an internal, substantially horizontal partition dividing the respective internal volume into a treatment compartment below the partition and an overflow compartment above the partition. Each unit has, above the partition an inlet opening and an outlet opening.

In use, water flows into the upper by-pass chamber of the unit from the upstream storm sewer pipe. If the water inflow is less than the hydraulic capacity of the system, such water is diverted by a weir and orifice/drop pipe assembly, through the partition, into the lower treatment chamber. From the treatment chamber, water flows up along a riser pipe into the by-pass chamber on the downstream side of the weir and is discharged into the downstream storm sewer.

The water velocity slows when it enters the treatment chamber. Oil and other liquids that are less dense than water will rise and become trapped beneath the partition. These pollutants are retained in the treatment chamber because the entrance to the outlet riser pipe is submerged. Sediment that is denser than water will gravitationally settle to the bottom of the chamber. If the flow exceeds the hydraulic capacity of the treatment system, at least a portion of the incoming water will flow over the weir and be conveyed directly to the downstream sewer. This action prevents high flows from entering the lower treatment chamber, and ensures that previously captured pollutants are not scoured or re-suspended.

GENERAL DESCRIPTION OF THIS INVENTION

The new system is configured to utilize two units operating in parallel to provide twice the storage volume and detention time, while being installed in line with each other.

In essence, the installation carries out the following actions: it divides any fluid arriving at the inlet opening of the upstream unit into first and second substantially equal streams. The first stream passes through the upstream unit treatment compartment, thence along a first conduit connecting the two units, thence over the downstream unit partition to the outlet opening of the downstream unit. In this step, the treatment compartment utilized is the first one encountered by entering water. At the same time, the second stream passes over the upstream unit partition, thence along a second conduit connecting the two units, thence through the downstream unit treatment compartment, and finally to the outlet opening of the downstream unit.

Thus, the treatment chambers of both Stormceptor units are continuously in use, so long is some inflow is occurring.

More particularly, this invention provides a water-handling installation, comprising:

an upstream separator unit and a downstream separator unit, each unit having an outer wall enclosing an internal volume, each unit having an internal, substantially horizontal partition dividing the respective internal volume into a treatment compartment below the partition and an overflow compartment above the partition, each unit having, above the partition, an inlet opening and an outlet opening, a first and a second conduit, each conduit communicating the outlet opening of the upstream unit with the inlet opening of the downstream unit, the upstream unit having:
a drop pipe providing a passageway communicating a first aperture in the upstream partition with an infeed supply location in the upstream treatment compartment,
a first upstream weir at least partly surrounding said first aperture and defining a first upstream basin configured to receive substantially half of any liquid inflow through said inlet opening of the upstream unit,
a riser pipe providing a passageway communicating a second aperture in the upstream partition with an outfeed supply location in the upstream treatment compartment,
a second upstream weir at least partly surrounding said second aperture and defining a second upstream basin adapted to empty into said first conduit,
the partition being so configured that the other half of any said liquid inflow passes above the upstream partition from the inlet opening to said second conduit;

the downstream unit having:
a drop pipe providing a passageway communicating a first aperture in the downstream partition with an infeed supply location in downstream treatment compartment,
a first downstream weir at least partly surrounding said last-mentioned aperture and defining a first downstream basin configured to receive substantially all of the liquid arriving by way of the second conduit,
a riser pipe providing a passageway communicating a second aperture in the downstream partition with an outfeed supply location in the downstream treatment compartment,
a second downstream weir at least partly surrounding said second aperture in the downstream partition, and defining a second downstream basin adapted to discharge into the outlet opening of the downstream unit,
the downstream partition being so configured that liquid arriving by way of the first conduit passes above the downstream partition to the outlet opening of the downstream unit.

Furthermore, this invention provides an installation for handling water at low and high flow states, utilizing upstream and downstream separator units, each unit having an outer wall that encloses an internal volume which is divided by a substantially horizontal partition into a treatment compartment below the partition and an overflow compartment above the partition, each unit having, above the partition, an inlet opening and an outlet opening, first and second conduits communicating the outlet opening of the upstream unit with the inlet opening of the downstream unit, and ducting and weir means ensuring that the flow of liquids through the installation will be such that liquid arriving at he inlet opening of the upstream unit will be divided into first and second substantially equal streams, the first stream passing through the upstream unit treatment compartment, thence along the first conduit, thence over the downstream unit partition to the outlet opening of the downstream unit, the second stream passing over the upstream unit partition, thence along the second conduit, thence through the downstream unit treatment compartment, and finally to the outlet opening of the downstream units.

Finally, this invention provides, for use with an installation for handling water at low and high flow rates, and that utilizes an upstream and a downstream separator unit, each unit having an outer wall that encloses an internal volume which is divided by a substantially horizontal partition into a treatment compartment below the partition and an overflow compartment above the partition, each unit having, above the partition, an inlet opening and an outlet opening the installation including first and second conduits, both communicating the outlet opening of the upstream unit with the inlet opening of the downstream unit, an operating process comprising the following modes:
 a) a first mode carried out when the total arriving liquid is less than the maximum that can be simultaneously received by the two treatment compartment,
 the first mode consisting of.
  dividing into first and second substantially equal streams any liquid arriving at the inlet opening of the upstream unit,
  passing the first stream through the upstream unit treatment compartment, thence along the first transfer pipe, thence over the downstream unit partition to the outlet opening of the downstream unit,
  and passing the second stream over the upstream unit partition, thence along the second transfer pipe, thence through the downstream unit treatment compartment, and finally to the outlet opening of the downstream unit; and
 b) a second mode carried our when the total arriving liquid is greater than said maximum, the second mode consisting of allowing the excess incoming liquid to overflow all weirs and partitions and pass directly from the upstream inlet opening to the downstream outlet opening,

GENERAL DESCRIPTION OF THE DRAWINGS

Figure 2:
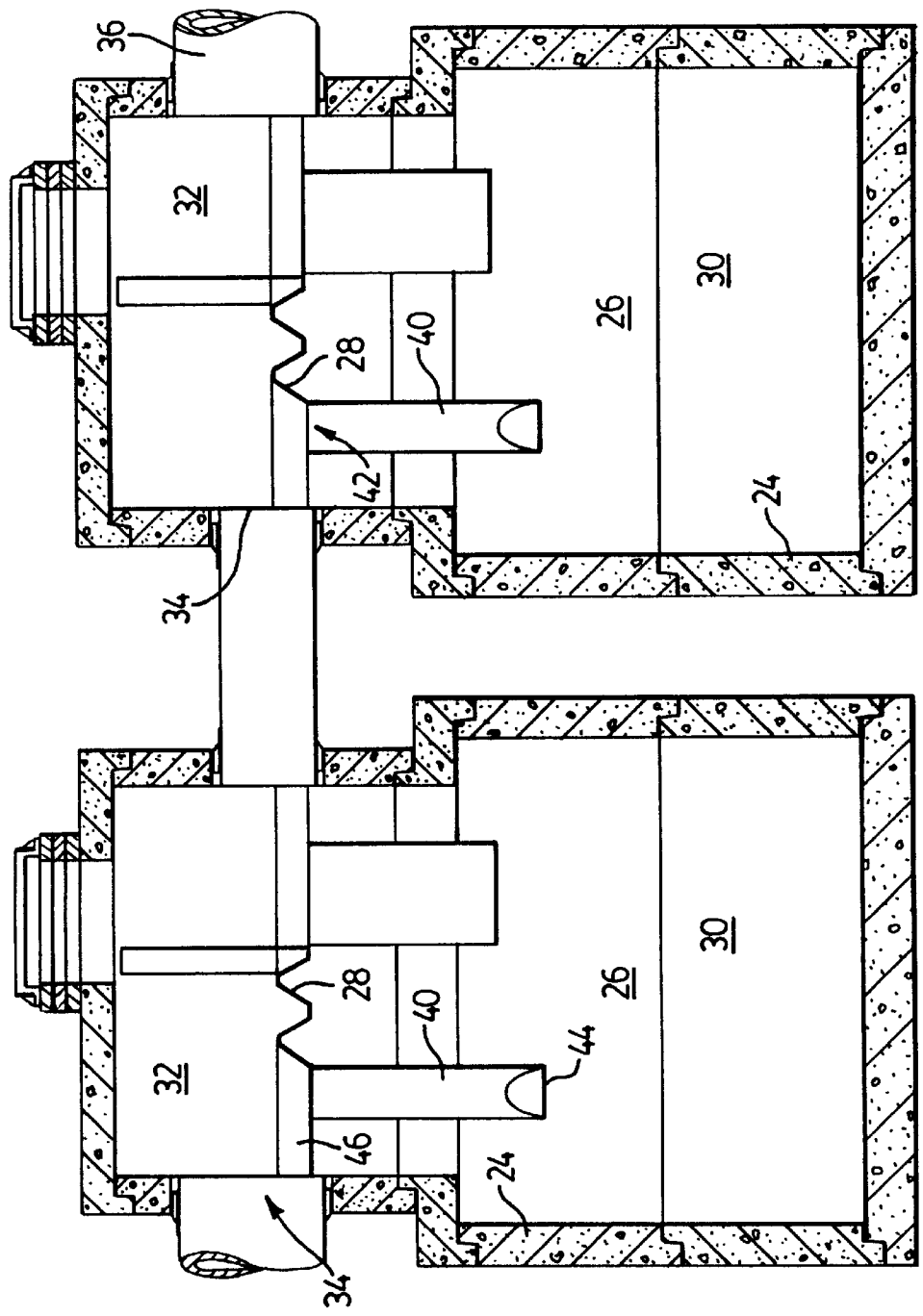

One embodiment of this invention is illustrated in the accompanying drawings, in which like numerals denote like parts throughout the several views, and in which:

FIG. 1 is a top plan view of the installation according to the invention, showing two adjacent Stormceptor units, a connection therebetween, and the essential ducting, weirs, apertures and the like necessary for proper operation of the system; and FIG. 2 is a vertical sectional view of the Stormceptor units, taken at the line 2—2 in FIG. 1

DETAILED DESCRIPTION OF THE DRAWINGS

The novel system is configured utilizing two units 21 and 22 of the kind known as the "Stormceptor". Hereinafter, these units will be referred to as "separator units".

As can be seen by comparing FIGS. 1 and 2, each separator unit has an outer wall 24 enclosing an internal volume 26 Each separator unit further has an internal, substantially horizontal partition 28 which divides the respective internal volume 26 into a treatment compartment 30 below the partition 28 and an overflow compartment 32 above the partition 28. Further, each unit 21, 22 has, above the partition 28, an inlet opening 34 (to the left in FIG. 2) and an outlet opening 36 (to the right in FIG. 2).

Additionally, there is provided what may be regarded as first and second transfer means in the form of conduits 58 and 60 for communicating the outlet opening of the upstream separator unit 21 with the inlet opening 36 of the downstream unit 22.

As shown, the upstream unit 21 further has a drop pipe 40 providing a passageway communicating a first aperture 42 m the partition 28 with an infeed supply location 44 in the treatment compartment 30 of the upstream unit 21.

A first weir 46 at least partly surrounds the first aperture 42 and defines a first basin 48 which is configured to receive substantially half of any liquid inflow through the inlet opening 34 of the upstream unit 21. As can be seen in FIG. 1, this is accomplished by having the weir 46 meet the inlet 34 at the half-way point.

AS can be further seen, the upstream separator unit 21 incorporates a second weir 50 which at least partly surrounds a second aperture 52 and defines a second basin 54 which is adapted to empty into the first conduit 58 the partition 28 is so configured that the other half of any liquid inflow at the inlet opening 34 passes above the partition 28 from the inlet opening 34 to the second conduit 60.

The downstream separator unit 22 has essentially the same structure as the first separator unit 21. Where the parts are identical as between the two separtor units 21, 22, the same numerals have been used.

It is helpful at this point to understand what happens to the flow through the two units.

Viewed from a method standpoint, the apparatus functions to firstly divide any liquid arriving at the inlet opening 34 of the upstream unit 21 into first and second substantially equal streams. One stream then passes through the upstream unit treatment compartment 30 (entering by way of aperture 42 of the upstream unit), then up the insert 52, thence along the first conduit 58, thence over the downstream unit partition 28 to the inlet opening 36 of the downstream separator unit 22. Simultaneously, the other stream passes over the upstream unit partition 28, thence along the second conduit 60, thence through the downstream unit treatment compartment 30, and finally to the outlet opening 36 of the downstream unit, the major distinction has to do with whether the stream in question has been treated or not. For the upstream separator unit 21 untreated water arriving at the inlet 34 splits into a first untreated stream which passes over the partition 28, thence along the conduit 60. Up to this point, the stream in question has not been treated. When it enters the downstream separator unit 22 however it passes through the aperture 42 and receives treatment in the treatment compartment 30 of the downstream unit.

The other stream created at the inlet 34 (of the upstream separator unit 21) is immediately treated in the upstream unit by passing through the aperture 42 thereof and through the upstream treatment chamber. This liquid, which has now been treated, comes up through the aperture 52 of the upstream unit, passes along the conduit 58, and then flows above the partition 28 of the downstream separator unit 22, to arrive at the outlet 36. While flowing along conduit 58 and over the partition of the downstream separator unit 22, this stream is in treated condition.

It will be appreciated that the orderly distribution of stream flow just described requires the liquid inflow not to exceed a particular rate representing the most that can be accepted through the apertures 42, When the latter rate is exceeded, the system automatically reverts to the second mode of operation, in which the excess incoming liquid at 34 simply overflows all weirs and partitions and runs directly to the downstream outlet 36, without disturbing the liquid in the treatment compartments 30.

While one embodiment of this invention has been illustrated in the accompanying drawings and described hereinabove, it will be evident to those skilled in the art that changes and modifications may be made therein without departing from the essence of this invention, as set forth in the appended claims.

The embodiments of the invention in which an exclusive Property or privilege is claimed are defined as follows:

1. A water-handling installation, comprising:
    an upstream separator unit and a downstream separator unit, each of the units having an outer wall enclosing an internal volume, each of the units having an internal, substantially horizontal partition dividing the respective internal volume into a treatment compartment below the partition and an overflow compartment above the partition, each of the units having, above the partition, an inlet opening and an outlet opening,
    a first conduit and a second conduit, each of the conduits communicating the outlet opening of the upstream unit with the inlet opening of the downstream unit,
    the upstream unit having:
        an upstream drop pipe providing a passageway communicating a first aperture in the upstream partition with an infeed supply location in the upstream treatment compartment,
        a first upstream weir at least partly surrounding said first aperture and defining a first upstream basin configured to receive substantially half of any liquid inflow through said inlet opening of the upstream unit,
        an upstream riser pipe providing a passageway communicating a second aperture in the upstream partition with an outfeed supply location in the upstream treatment compartment,
        a second upstream weir at least partly surrounding said second aperture and defining a second upstream basin adapted to empty into said first conduit,
        the upstream partition being so configured that the other half of any said liquid inflow passes above the upstream partition from the inlet opening to said second conduit; the downstream unit having:
            a downstream drop pipe providing a passageway communicating a first aperture in the downstream partition with an infeed supply location in the downstream treatment compartment,
            a first downstream weir at least partly surrounding said, first aperture and defining a first downstream basin configured to receive substantially all of the liquid arriving by way of the second conduit,
            a downstream riser pipe providing a passageway communicating a second aperture in the downstream partition with an outfeed supply location in the downstream treatment compartment,
            a second downstream weir at least partly surrounding said second aperture in the downstream partition, and defining a second downstream basin adapted to discharge into the outlet opening of the downstream unit,
    the downstream partition being so configured that the liquid arriving by way of the first conduit passes above the downstream partition to the outlet opening of the downstream unit.

2. An installation for handling water at low and high flow rates, utilizing upstream and downstream separator units, each of the units having an outer wall that encloses an internal volume which is divided by a substantially horizontal partition into a treatment compartment below the partition and an overflow compartment above the partition, each of the units having, above the partition, an inlet opening and an outlet opening,
    first and second conduits communicating the outlet opening of the upstream unit with the inlet opening of the downstream unit,
    and ducting and weir means ensuring that the flow of liquids through the installation is such that the liquid arriving at the inlet opening of the upstream unit, are divided into first and second substantially equal streams, the first stream passing through the upstream unit treatment compartment, thence along the first conduit, thence over the downstream unit partition to the outlet opening of the downstream unit, the second stream passing over the upstream unit partition, thence along the second conduit, thence through the downstream unit treatment compartment, and finally to the outlet opening of the downstream unit.

3. The installation claimed in claim 2, in which the ducting and weir means includes.
    in the upstream unit:
        an upstream drop pipe providing a passageway communicating a first aperture in the upstream partition with an infeed supply location in the treatment compartment,
        a first upstream weir at least partly surrounding said first aperture and defining a first basin configured to receive substantially half of any liquid inflow through said inlet opening of the upstream unit,
        an upstream pipe providing a passageway communicating a second aperture in the upstream partition with an outfeed supply location in the treatment compartment,
        a second upstream weir at least partly surrounding said second aperture and defining a second basin adapted to empty into said first conduit,
        the upstream partition bring so configured that the other half of any said liquid inflow passes above the upstream partition from the inlet opening to said second conduit;
    and in the downstream unit:
        a downstream drop pipe providing a passageway communicating a first aperture in the downstream partition with an infeed supply location in the downstream treatment compartment,
        a first downstream weir at least partly surrounding said first aperture and defining a first basin configured to receive substantially all of the liquid arriving by way of the second conduit,
        a downstream riser pipe providing a passageway communicating a second aperture in the downstream partition with a further outfeed supply location in the downstream treatment compartment,
        a second downstream weir at least partly surrounding said second aperture and defining a second basin adapted to discharge into the outlet opening of the downstream unit, the downstream partition being so configured that liquid arriving by way of the first conduit passes above the downstream partition to the outlet opening of the downstream unit.

4. The installation claimed in claim 3, in which one of the apertures in each of the partitions has a diameter large enough to allow a worker to descend into the treatment compartment for inspection and repair.

5. For use with an installation for handling water at low and high flow rates, and that utilizes upstream and downstream separator units, each of the units having an outer wall that encloses an internal volume which is divided by a substantially horizontal partition into a treatment compartment below the partition and an overflow compartment above the partition, each of the units having, above the partition, an inlet opening and an outlet opening, the installation including first and second conduits communicating the outlet opening of the upstream unit with the inlet opening of the downstream unit, an operating process comprising the following modes:
a) a first mode carried out when the total arriving liquid is less than a maximum flow rate that can be simultaneously received by the two treatment compartments,
the first mode consisting of:
dividing into first and second substantially equal streams of any water arriving at the inlet opening of the upstream unit,
passing the first stream through the upstream unit treatment compartment, thence along the first conduit, thence over the downstream unit partition to the outlet opening of the downstream unit,
and passing the second stream over the upstream unit partition, thence along the second conduit, thence through the downstream unit treatment compartment, and finally to the outlet opening of the downstream unit; and
b) a second mode carried out when the total arriving fluid is greater than said maximum, flow rate the second mode consisting of allowing the excess incoming liquid to overflow the partitions and pass directly from the upstream inlet opening to the downstream outlet opening.

* * * * *